United States Patent Office 3,249,651
Patented May 3, 1966

3,249,651
THERMOSETTING COMPOSITIONS COMPRISING ALDEHYDE/ACRYLAMIDE COPOLYMER CONDENSATES, AND ACRYLIC/NORBORNENE COPOLYMERS OR EPOXY GRAFTS THEREOF
Norman G. Gaylord, New Providence, N.J., assignor to Interchemical Corporation, New York, N.Y., a corporation of Ohio
No Drawing. Filed Feb. 26, 1960, Ser. No. 11,136
14 Claims. (Cl. 260—834)

This invention relates to new thermosetting coating compositions. More particularly, it relates to new thermosetting coating compositions comprising blends of low molecular weight organic solvent soluble acrylic copolymers and resins formed by the alkylolation of acrylamides. These coating compositions, when cured yield durable surface coatings which are very hard, exhibit an excellent resistance to scratching, staining, washing and weathering and have high gloss and flexibility.

Copending application, Serial No. 768,839, filed October 22, 1958, now United States Patent No. 2,985,611, discloses a new low molecular weight organic solvent soluble acrylic copolymer formed by the addition polymerization of a non-allylic alcohol containing the norbornene nucleus, at least one alkyl ester of acrylic or methacrylic acid, the alkyl group of which contains from 1 to 8 carbons and an optional amount of certain monomers which include acids such as acrylic and methacrylic; nitriles, such as acrylonitrile and methacrylonitrile; vinyl esters, such as vinyl acetate, vinyl propionate and vinyl stearate; esters of unsaturated dibasic acids, such as dimethyl maleate and dibutyl fumarate; styrene, alphamethyl styrene, and the various vinyl toluenes; amides, such as acrylamide, methacrylamide, methylolacrylamide, and methylol-methacrylamide; hydroxy compounds such as ethylene glycol monoacrylate or monomethacrylate, glycerol monoacrylate or monomethacrylate or glycerol allyl ether; and vinyl alkyl ethers such as vinyl butyl ether, vinyl ethyl ether, vinyl hexyl ether, etc.

It has now been discovered that when these norbornene containing acrylic copolymers are blended with the alkylolated acrylamide products of this invention in volatile organic solvent, a novel thermosetting composition is formed which has excellent hardness and flexibility properties in addition to a high gloss and very good resistance to scratching, weathering and washing. These compositions are particularly suited for coatings for household appliances. The compositions in these blends have unusual pigment-wetting power, which makes easy the dispersion of pigments such as carbon black, titanium dioxide and phthalocyanines in vehicles containing these copolymers.

The alkylolated acrylamides comprise the reaction products of aldehydes and copolymers containing acrylamides and at least one other ethylenically unsaturated monomer.

The acrylamide containing copolymers used in this invention may be prepared by any of the conventional methods well known to those skilled in the art. U.S. Patent No. 2,173,005, issued September 12, 1939, to Daniel E. Stain gives one process for preparing acrylamide containing copolymers. Acrylamide monomers may be copolymerized with a wide variety of ethylenically unsaturated monomers including acrylic or methacrylic acids and their esters particularly methyl acrylate, ethyl acrylate, butyl acrylate, hexyl acrylate and octyl acrylate; nitriles of acrylic and methacrylic acids; vinyl halides; styrene and vinyl toluene; maleic acid and esters thereof; vinyl ethers; vinyl acetones, particularly methyl vinyl ketone; dibutyl maleate; vinyl pyridines; 2-chloro-butadiene-1,3, etc. It will be obvious to those skilled in the art that mixtures of the above monomers may be copolymerized with acrylamide monomers to give copolymers of widely varying properties. In other words by the proper selection of monomers and proportions, acrylamide containing copolymers may be made to have specific hardness and flexibility characteristics. In the practice of this invention, it is preferred to use acrylamide copolymers containing substantial amounts of stylrene, vinyl toluene and ethyl acrylate. The proportions are not critical. It is also preferable to include small quantities of methacrylic or acrylic acid.

In producing the alkylolated acrylamides of this invention, the acrylamide monomer is first copolymerized with the other ethylenically unsaturated monomers. The resulting acrylamide containing copolymer is then reacted with an aldehyde.

The entire reaction is preferably conducted in solution. The selected solvent must be one in which the acrylamide, the ethylenically unsaturated monomers and the aldehyde must be soluble. Aliphatic alcohols as methanol, ethanol and butanol are preferable as solvents with butanol being the most preferable of these. Ethylene glycol mono butyl ether and acetone may also be used as solvents either alone or in combination with other solvents. It should be noted that the preferred solvents may be cut or mixed with aromatic hydrocarbon solvents such as xylene. The copolymerization of the monomers to form the acrylamide copolymer is initiated by "catalysts" or polymerization initiators of the free radical type. The most commonly used initiators are azo compounds and organic peroxygen compounds. Typical of the azo compounds that may be used for this purpose are azobisisobutyronitrile, and azobisisovaleronitrile. Typical of the organic peroxygen compounds that may advantageously be used as copolymerization initiators are such compounds as cumene hydroperoxide, tertiary butyl perbenzoate, peracetic acid, acetyl peroxide, perbenzoic acid, benzoyl peroxide, lauroyl peroxide, stearoyl peroxide, ditertiary butyl peroxide, tertiary butyl hydro-peroxide, methyl ethyl ketone-hydrogen peroxide adduct, and cyclohexanone-hydrogen peroxide adduct.

It is desirable that the acrylamide copolymers have a low molecular weight in order to insure solubility thereof in the solvents used for the coating composition of this invention. Accordingly, it is preferable to add "chain stoppers" during the polymerization of the acrylamide copolymer. Mercaptans such as dodecyl mercaptans, hexyl mercaptans and octyl mercaptans are conventionally used.

While formaldehyde is used in methylolating the acrylamide copolymer, it will be obvious that other aldehydes may be used to alkylolate the polymer. While not critical, it is preferable to react 2 equivalentst of formaldehyde for every 1 equivalent of acrylamide in the copolymer.

It should be noted that in case the reactions are conducted in alkanol solvents such as butanol in the present case, the alkylol groups or methylol groups on the final product become etherified to alkoxyalkyl groups or in the case where formaldehyde is used in butanol, the condensation product is butoxymethylated.

The norbornene nucleus containing acrylic copolymers which are blended with the butoxymethylated acrylamide-epoxy resin condensation products are defined in copending application, Serial No. 768,839, filed October 22, 1958, now United States Patent No. 2,985,611, as the solution polymerization product of a mixture of monomers comprising (1) a minor portion of a non-allylic alcohol containing the norbornene nucleus, (2) a major proportion of an ester or a mixture of esters selected from the group consisting of the alkyl esters of acrylic and methacrylic acid in which the alkyl groups contain from one to eight carbon atoms. The non-allylic alcohol containing the norbornene nucleus will ordinarily constitute about 5 to 30% of the copolymerization mixture, and the $C_1$–$C_8$ alkyl esters of acrylic and/or methacrylic acids will usually constitute from about 50% to about 95% of the copolymerization mixture. Preferably, there will also be present in the copolymerization mixture certain optional modifiers in amount about 2 to 35%. These modifiers have already been listed hereinabove.

With respect to the non-allylic alcohols containing the norbornene nucleus it should be noted that norbornene has the following structure

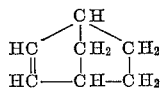

While for the purposes of describing the present invention, reference will be made mostly to copolymers of 2-hydroxymethyl-5-norbornene which has the following structure

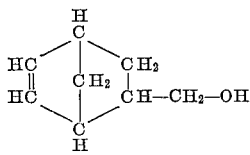

it will be understood that related homologs can readily be used and it is intended that the appended claims will cover the use of such compounds.

2-hydroxymethyl-5-norbornene is readily prepared by reacting allyl alcohol with cyclopentadiene (U.S. Patents No. 2,596,279 and No. 2,352,606). Alkyl substituted cyclopentadiene behave similarly to yield corresponding substituted derivatives. Likewise compounds containing two alcoholic hydroxyl groups can be obtained by condensing an unsaturated diol, such as butenediol with cyclopentadiene.

These acrylic copolymers are prepared in solution by addition polymerization initiated by conventional free radical type initiators which have been described fully hereinabove. Benzoyl peroxide is preferably used as an initiator in the polymerization. Xylene is preferably used as the solvent although other conventional solvents such as benzene, ethyl benzene or toluene may be used.

In a further embodiment of this invention epoxy resin-acrylic graft copolymers which are more fully described in copending application Serial No. 808,887, April 24, 1959, now United States Patent No. 3,028,359, may be used in place of the acrylic copolymers. These graft copolymers are prepared by the above described method for preparing the norbornene nucleus containing acrylic copolymers and using the same ingredients except that said monomers are polymerized by addition polymerization in the presence of epoxy resins.

The epoxy resins used in the graft copolymers are conventionally prepared by reacting a polyhydric phenol, particularly Bisphenol A (2,2-diphenol propane) with epichlorohydrin. By regulating the proportions of these two reactants, the molecular size and the molecular structure of the ethoxyline resins produced may be controlled. By using an excess of epichlorohydrin, a low molecular weight ethoxyline resin is produced. By increasing the amount of Bisphenol A used, higher molecular weight epoxy resins are produced. In the preparation of these graft copolymers, it is preferable to use epoxy resins having molecular weights of 350 to 875, epoxide equivalent weights of 175 to 525 and an average of 1.7 to 1.9 epoxides per molecule. We have found best results are secured when epoxy resins having a molecular weight of 875, an epoxide equivalent weight of 435 and an average of 1.7 to 1.9 epoxy groups per molecule are used. One available commercial resin having these properties is "Epon 1001". While it is not critical, it is preferred to have the epoxy resin constitute 0 to 35% parts by weight of the total starting reactants in the preparation of the graft copolymer.

Solutions of the alkoxyalkylated acrylamide products are blended with solutions of the acrylic copolymers. While not critical, it is preferred that the resins be blends in the ratio of 6–7 parts by weight on a solids basis of "acrylamide" resin for every 3 to 4 parts of acrylic resin. It should be noted that as the "acrylamide" resin is preferably in a solution comprising a 1:1 ratio of butanolxylene and the acrylic is preferably in a xylene solution, the amount of xylene in the final coating solution will often exceed the butanol present. Since acrylamides are difficulty soluble in xylene, the "acrylamide" resin may display a tendency to come out of solution if the amount of xylene present becomes too great. If this occurs, the resin may be restored into solution by the addition of butanol.

The following examples will illustrate the practice of this invention:

Example 1

54 g. of 2-hydroxymethyl-5-norbornene in 150 g. of xylene is heated with stirring under a nitrogen atmosphere to 90° C. A mixture of 231 g. of methyl methacrylate, 15 g. of methacrylic acid and 6 grams of benzoyl peroxide is added dropwise over a period of 1.5 hours while the temperature is maintained at 90° C. with intermittent cooling if necessary. 1.5 g. of benzoyl peroxide is added 1.5 hours after the addition of the mixture is completed. The temperature is maintained at 90° C. for 1.5 additional hours after which, it is raised to and maintained at 125° C. for 1 hour to destroy residual catalyst. The final copolymer solution has a 46.4% non-volatile content by weight indicating a 92.8% conversion to polymer.

Example 2

| Group A: | Grams |
|---|---|
| (2-hydroxymethyl-5-norbornene | 89.0 |
| Xylene | 246.9 |
| Butyl acrylate | 362.0 |
| Methyl methacrylate | 21.4 |
| Group B: | |
| Methacrylic acid | 21.4 |
| Xylene | 246.9 |
| Benzoyl peroxide | 9.9 |
| Group C: | |
| Benzoyl peroxide | 2.5 |

Group A is heated with stirring under nitrogen atmosphere to 90° C. Group B is added dropwise over a period of 1½ hours while the temperature is maintained at 90° C., with intermittent cooling, if necessary. C is added 1½ hours after the completion of the dropwise addition of B. The temperature is maintained at 90° C. for an additional 1½ hours and then the temperature is raised to 125° C. for 1 hour to destroy residual catalyst. The final copolymer solution has a 45.5% non-volatile content by weight indicating a 90.8% conversion of monomers to polymer.

Example 3

| | Grams |
|---|---|
| A. Epon 1001 [1] | 450 |
| B. 2-hydroxymethyl-5-norbornene | 270 |
| C. Xylene | 750 |
| D. Butyl acrylate | 1100 |
| E. Methyl methacrylate | 65 |
| F. Methacrylic acid | 65 |
| G. Xylene | 750 |
| H. Benzoyl peroxide | 30 |
| I. Benzoyl peroxide | 7.5 |

[1] Epon 1001—epoxy resin which is the reaction product of epichlorohydrin and Bisphenol A and has a molecular weight of 875, an epoxide equivalent weight of 485 and a hydroxyl equivalent weight of 145.

A, B and C are heated to 90° while continually stirring under a nitrogen atmosphere. D, E, F, G and H are mixed and the mixture is added dropwise to the A, B and C mixture over a period of 2½ hours while the temperature is maintained at 90° C. The mixture is maintained at 90° C. for ½ hour and I is added. The mixture is maintained at 90° C. for 1½ hours after which the mixture is raised to 125° C. and maintained at that temperature for 1 hour. The solids content of the product is 54.4% by weight.

*Example 4*

|   | Grams |
|---|---|
| A. Styrene | 400 |
| B. Methyl methacrylate | 80 |
| C. Ethyl acrylate | 200 |
| D. Acrylamide | 120 |
| E. Butanol | 800 |
| F. Tert-dodecyl mercaptan | 8 |
| G. Cumene hydroperoxide | 20 |

Ingredients B, C, and D are mixed and heated to 120° C. A, E, F and G are added while the temperature is maintained at 120° C. Heating at 120° C. is continued for 5 hours. 160 g. of Butyl Formcel (a 40% solution of formaldehyde in butanol) is added and the water formed is removed by azeotropic distillation over a period of 3 hours.

*Example 5*

|   | Grams |
|---|---|
| A. Styrene | 680 |
| B. Ethyl acrylate | 765 |
| C. Acrylamide | 255 |
| D. Butanol | 1700 |
| E. Tert-dodecyl mercaptan | 17 |
| F. Cumene hydroperoxide | 25.5 |

Ingredient C is dissolved in D and items A, B, E and F are added and the mixture is heated to 120° C. Heating at 120° C. is continued for 5 hours. 290 g. of Butyl Formcel and 3 g. of maleic anhydride are added and the mixture is heated at 120° C. for 4 hours to azeotropically distill water formed during the reaction. The product has a 45% solids content by weight.

*Example 6*

| Group A: | Grams |
|---|---|
| Styrene | 900 |
| Ethyl acrylate | 84 |
| Methacrylic acid | 36 |
| Acrylamide | 180 |
| Butanol | 600 |
| Xylene | 600 |
| Cumene hydroperoxide | 12 |
| t-Dodecyl mercaptan | 12 |
| Group B: | |
| t-Dodecyl mercaptan | 12 |
| Group C: | |
| t-Butyl perbenzoate | 6 |

Group A is heated to reflux at 120° C. B is added after 1 hour at 120° C. Heating at 120° C. is continued for 3 hours, after which C is added and heating is continued at 120° C. for 2 hours. 360 g. of Butyl Formcel is added and the mixture is maintained at 120° C. for 4 hours to azeotropically distill the water formed during the reaction.

*Example 7*

|   | Grams |
|---|---|
| A. Styrene | 850 |
| B. Methyl methacrylate | 136 |
| C. Ethyl acrylate | 425 |
| D. Acrylamide | 255 |
| E. Methacrylic acid | 34 |
| F. Butanol | 1700 |
| G. Tert-dodecyl mercaptan | 17 |
| H. Cumene hydroperoxide | 17 |
| I. Benzoyl peroxide | 8.5 |

Mix ingredients A through H and reflux at 114° C. for 3 hours. Add I and reflux for 2 additional hours at the same temperature. 310 g. of Butyl Formcel is added and the mixture is maintained at 120° C. for 4 hours to azeotropically distill the water formed during the reaction.

*Example 8*

1 part by weight of the product of Example 4 is blended with 1 part of the product of Example 1 and the resulting blend is drawn down on a steel panel and baked at 350° C. for 30 minutes. The baked film is well cured, hard, clear, flexible and displays high gloss and good color as well as high resistance to soaps, solvents and detergents. This blend may be pigmented with any of the standard enamel varnish pigments. When 60 parts by weight of the blend are drawn down on a steel panel and baked in accordance with the above schedule the resulting film displays properties equivalent to those of the unpigmented film.

*Example 9*

7 parts by weight of the product of Example 6 are blended with 3 parts by weight of the product of Example 2 and cured in accordance with the procedure of Example 8. The resulting film has properties equivalent to those of the film of Example 8.

*Example 10*

7 parts by weight of the product of Example 6 are blended with 3 parts by weight of the product of Example 3 and cured in accordance with the procedure of Example 3. The resulting film has properties equivalent to those of the film of Example 8.

*Example 11*

1 part by weight on a solids basis of the product of Example 5 is blended with 9 parts by weight on a solids basis of the product of Example 2 and cured in accordance with the procedure of Example 8. The resulting film has properties equivalent to those of the film of Example 8.

*Example 12*

2 parts by weight on a solids basis of the product of Example 5 are blended with 8 parts by weight of the product of Example 3 and baked in accordance with the procedure of Example 8. The resulting film has properties equivalent to those of the film of Example 8.

It will be understood that it is intended to cover all changes and modifications of the examples of the invention herein chosen for the purpose of illustartion which do not constitute departures from the spirit and scope of the invention.

What is claimed is:

1. A thermosetting composition comprising (1) the reaction product of an aldehyde and a copolymer of acrylamide and at least one other ethylenically unsaturated monomer and (2) an acrylic copolymer made by the addition polymerization of a mixture of monomers comprising from 5% to 30% by weight of a non-allylic alcohol containing the norbornene nucleus, and from 60% to 90% by weight of an ethylenically unsaturated ester material having the formula:

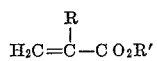

in which R is a member of the group consisting of hydrogen, methyl and ethyl, and R' is an alkyl radical containing from 1 to 8 carbon atoms, and up to 35% by weight of methacrylic acid.

2. A thermosetting composition according to claim 1, wherein said arcylic copolymer comprises the copolymerization product of 2-hydroxymethyl-5-norbornene, butyl acrylate, methyl methacrylate and methacrylic acid.

3. A thermosetting composition according to claim 1, wherein said acrylamide containing copolymer comprises acrylamide, vinyl toluene, ethyl acrylate and methacrylic acid.

4. A thermosetting composition according to claim 1, wherein said acrylamide containing copolymer comprises acrylamide, styrene, ethyl acrylate and methyl methacrylate.

5. A thermosetting composition according to claim 1, wherein said aldehyde is formaldehyde.

6. A thermosetting composition according to claim 1, wherein said reaction product of the aldehyde and said copolymer of acrylamide is butylated.

7. A heat curable surface coating composition comprising a volatile organic solvent solution of the blend claimed in claim 1.

8. The thermosetting composition of claim 1, wherein said acrylic copolymer is made by the addition polymerization of a mixture of monomers comprising from 5% to 30% by weight of a non-allylic alcohol containing the norbornene nucleus, and from 60% to 90% by weight of an ethylenically unsaturated ester material having the formula

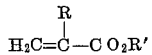

in which R is a member of the group consisting of hydrogen, methyl and ethyl, and R' is an alkyl radical containing from 1 to 8 carbon atoms and up to 35% by weight of methacrylic acid in the presence of an ethoxyline resin formed by the reaction of epichlorohydrin and 2,2-diphenol propane having an average molecular weight of 875, an epoxide equivalent weight of 450–525 and a hydroxyl equivalent weight of 145.

9. A heat curable surface coating composition comprising a volatile organic solvent solution of the blend claimed in claim 2.

10. A heat curable surface coating composition comprising a volatile organic solvent solution of the blend claimed in claim 3.

11. A heat curable surface coating composition comprising a volatile organic solvent solution of the blend claimed in claim 4.

12. A heat curable surface coating composition comprising a volatile organic solvent solution of the blend claimed in claim 5.

13. A heat curable surface coating composition comprising a volatile organic solvent solution of the blend claimed in claim 6.

14. A heat curable surface coating composition comprising a volatile organic solvent solution of the blend claimed in claim 8.

References Cited by the Examiner

UNITED STATES PATENTS

| | | | |
|---|---|---|---|
| 2,173,005 | 9/1939 | Strain | 260—853 |
| 2,978,437 | 4/1961 | Christenson | 260—834 |
| 2,985,611 | 5/1961 | Gaylord et al. | 260—853 |
| 3,028,359 | 4/1962 | Gaylord | 260—837 |
| 3,062,776 | 11/1962 | Gaylord | 260—837 |

MURRAY TILLMAN, *Primary Examiner.*

DAN ARNOLD, LEON J. BERCOVITZ, *Examiners.*